A. PICARD.
COMBINED TEA AND COFFEE POT.
APPLICATION FILED MAY 7, 1919.
1,312,203.
Patented Aug. 5, 1919.
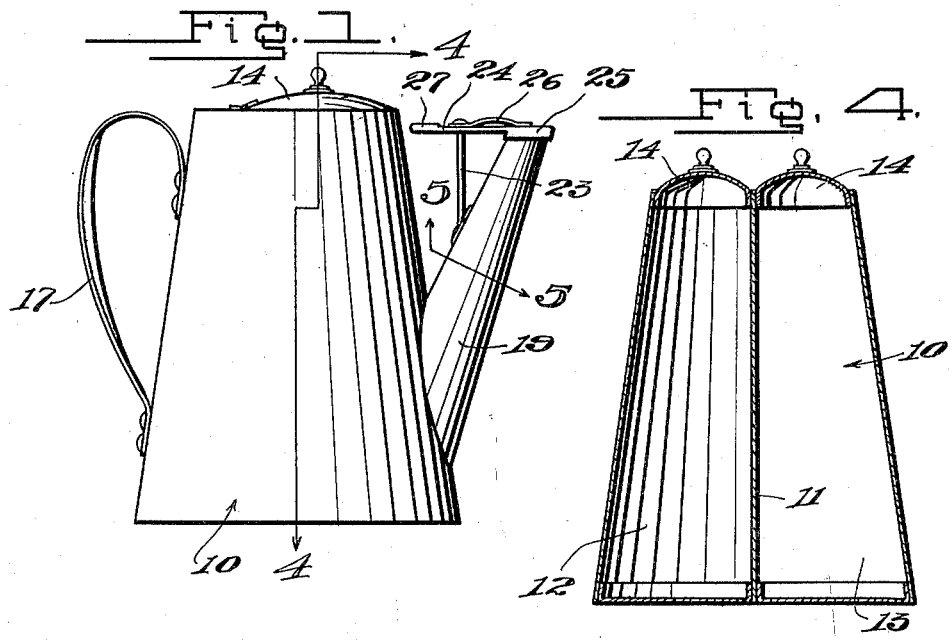
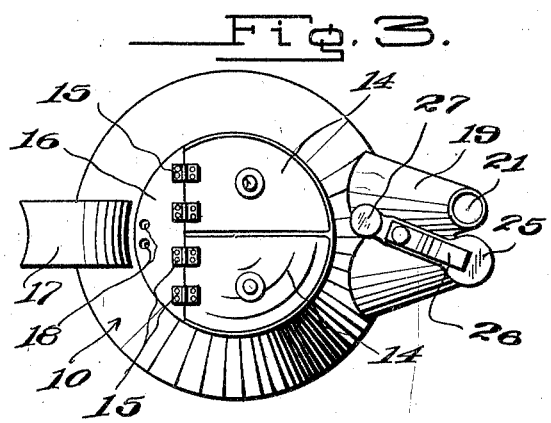
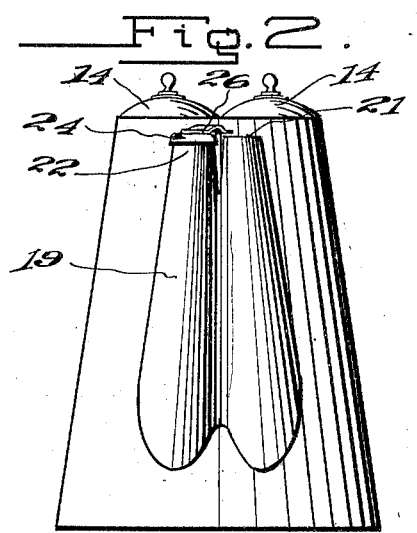
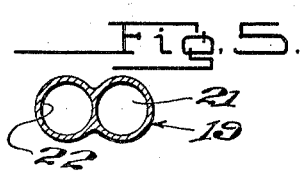
Aldric Picard,
Inventor

UNITED STATES PATENT OFFICE.

ALDRIC PICARD, OF OLDTOWN, MAINE.

COMBINED TEA AND COFFEE POT.

1,312,203.   Specification of Letters Patent.   Patented Aug. 5, 1919.

Application filed May 7, 1919. Serial No. 295,295.

*To all whom it may concern:*

Be it known that I, ALDRIC PICARD, a citizen of the United States, residing at Oldtown, in the county of Penobscot and State of Maine, have invented certain new and useful Improvements in Combined Tea and Coffee Pots, of which the following is a specification.

This invention relates to a combined tea and coffee pot, an object of the invention is to provide a pot for making both tea and coffee, which pot has a spout structure provided with a pair of spaced passage ways having communication with the compartments of the pot to permit the descension of liquid from either of the compartments.

A further object of the invention is to provide a closure for the open ends of the spout which is pivotally supported and spring controlled, being adapted for positioning over the outlet of either of the spout passage ways for preventing the passing of liquid from both of the compartments of the pot at the same time.

A further object of the invention is to provide a device as specified, which is simply constructed, durable and may be manufactured at a relatively low cost.

Other objects of the invention will appear in the following detailed description taken in connection with the accompanying drawing forming a part of this specification and in which drawing:

Figure 1 is a side elevation of the improved combined coffee and tea pot.

Fig. 2 is a front elevation of the combined coffee and tea pot.

Fig. 3 is a top plan of the pot.

Fig. 4 is a vertical section taken on the line 4—4 of Fig. 1, and

Fig. 5 is cross-section through the spout taken on the line 5—5 of Fig. 1.

Referring more particularly to the drawing wherein like characters indicate like and corresponding parts, 10 indicates the main body of the pot which is constructed of any suitable material, and has a partition 11 extending vertically through the center thereof dividing the interior of the pot into compartments 12 and 13, which are adapted to contain different beverages, such as coffee and tea. The compartments 12 and 13 open out into the top of the body 10, and each is closed by a separate cover or closure 14, which snugly fits in the top of the compartments to prevent the covers from opening when the pot is tilted, for preventing the spilling of the beverage or liquid from one compartment or the other. The covers 14, do not extend over the entire upper portion of the compartments as will be seen by particular reference to Fig. 3 of the drawing, but they are hingedly connected by means of hinges 15 to a stationary portion 16 of the pot, which is adjacent to the handle 17 thereof. The stationary portion 16 is provided with a pair of spaced openings 18, one having communication with each of the compartments 12 and 13 to permit the escape of steam therefrom which would be generated during the placing of the beverages in the compartments.

The spout structure, generically indicated by the numeral 19, is attached to the body 10 in the usual manner, and it comprises a pair of passage ways, one communicating with the compartment 12 and the other with the compartment 13. These passage ways open out through spaced outlet openings 21 and 22. A suitable supporting bracket 23 is attached to the spout structure 19 and pivotally supports the closure member 24. This closure member 24 is provided with a cover of cap like structure 25 adapted to snugly fit over either of the outlets 21 or 22 to prevent the passage of liquid therefrom, and a flat spring 26 is carried by the closure member 24 for holding the cap 25 in snug engagement with either of the outlet ends of the spout structure 19. A thumb rest 27 is formed upon the closure member 24 upon the opposite side of the pivotal support thereof from the cap 25 and it is provided to facilitate the manual construction of the closure member to regulate the closing of either of the outlet openings and consequently regulate the beverage dispensed.

Changes in details may be made without departing from the spirit of this invention, but;

I claim:

1. In a combined tea and coffee pot, the combination, of a body, a partition in the body divided into a plurality of compartments, a spout including a plurality of passage ways communicating with said compartments, a support carried by said spout, a closure member pivotally carried by said support and adapted to be moved to form a closure for the outlet of either of said passage ways, and a spring carried by said support and engaging said closure member to maintain it in firm closing engagement with the outlet of the spout.

2. In a combined tea and coffee pot, the combination, of a body, a partition in the body, divided into a plurality of compartments, a spout including a plurality of passage ways communicating with said compartments, a support carried by said spout, a closure member pivotally carried by said support and adapted to be moved to form a closure for the outlet of either of said passage ways, a spring carried by said support and engaging said closure member to maintain it in firm closing engagement with the outlet of the spout, and independent covers for each of the compartments hingedly carried by said body.

ALDRIC PICARD.

Copies of this patent may be obtained for five cents each, by addressing the "Commissioner of Patents, Washington, D. C."